United States Patent Office 3,326,946
Patented June 20, 1967

3,326,946
DERIVATIVES OF EPOXIDIZED UNSATURATED
FATTY ACIDS
Paul Zuppinger, Arlesheim, Ulrich Niklaus, Basel, Kurt Brugger, Muenchenstein, and Heinrich Zwicky, Therwil, Switzerland, assignors to Ciba Limited, Basel, Switzerland, a Swiss company
No Drawing. Filed May 7, 1963, Ser. No. 278,778
7 Claims. (Cl. 260—404.5)

The present invention provides new amides containing amino groups which are obtained when an aliphatic mono-carboxylic acid containing at least one epoxide or oxirane group and at least 12 carbon atoms, or an ester of such acid with a monohydric or polyhydric alcohol, is reacted in the first stage of the process with an alcohol and/or phenol while splitting the epoxide group(s) of the monocarboxylic acid or of its ester, with simultaneous etherification of the alcohol or phenol, and in the second stage of the process the resulting etherified product is reacted with an aliphatic diamine or polyamine containing at least two primary or secondary amino groups accompanied by elimination of water or of alcohol.

The new amides containing amino groups are readily compatible with the majority of conventional types of epoxy resins; the mixtures of the amides and the epoxy resins can be cured at room temperature or with heating to form insoluble and infusible resins having excellent mechanical properties. Such curable mixtures are of special value for surface protection. Compared with the types of polyamides known as curing agents for epoxy resins—for example the polyamides obtained by reacting unsaturated dimerized vegetable fatty acids with aliphatic diamines or polyamines—the new amides of the invention possess numerous advantages.

The curing of the lacquer films is not accompanied by the misting of the film surface or the objectionable exudation of greasy constituents on the film surface, associated with most of the known curable lacquer compositions based on epoxy resins and amides. This is specially important when a previously applied, semidried primer coat is covered with one or several further lacquer coats.

The reaction of the aliphatic monocarboxylic acid containing epoxide groups with an alcohol is advantageously performed in the presence of a Lewis acid, more especially boron trifluoride or a complex thereof, for example boron trifluoride diethyl etherate. In general, this reaction takes an exothermic course so that no external heat need be supplied in the first reaction stage.

The reaction of the aliphatic monocarboxylic acid containing epoxide groups, or of its ester with a phenol, is advantageously carried out with heating of the reactants to a temperature ranging, for example, from 100 to 200° C.

As examples of aliphatic monocarboxylic acids containing epoxide groups and at least 12 carbon atoms, suitable for use as starting material in the present process, there may be mentioned:

5:6-epoxy-lauric acid, 9:10-epoxy-myristic acid, 9:10-epoxy-palmitic acid, 9:10-epoxy-stearic acid (epoxidized oleic acid, 9:10:12:13-diepoxy-stearic acid (epoxidized linoleic acid), epoxidized tall oil fatty acid, epoxidized maize fatty acid, epoxidized cotton seed fatty acid, epoxidized castor oil fatty acid, epoxidized soybean oil fatty acid, epoxidized tung oil fatty acid, epoxidized rape oil fatty acid, epoxidized olive oil fatty acid, epoxidized groundnut oil fatty acid, epoxidized linseed oil fatty acid and epoxidized sunflower oil fatty acid.

In performing the present process there may be used instead of the free epoxidized monocarboxylic acid an ester thereof with a monohydric alcohol, such as methanol, ethanol, n-propanol, isopropanol, n-butanol, isobutanol, 1-hexanol; or an ester with a polyhydric alcohol such as ethyleneglycol, 1:4-butanediol, 1:2:4-hexanetriol or more especially glycerol. Suitable examples are: methyl-9:10-epoxy-stearate, ethyl-9:10 - epoxystearate, glycerol-tris-9:10-epoxystearate, and epoxidized animal or vegetable fats and oils derived from unsaturated fatty acids, such as epoxidized tall oil, epoxidized cotton seed fat, epoxidized maize fat, epoxidized soybean fat, epoxidized tung oil, epoxidized rape oil, epoxidized castor oil, epoxidized olive oil, epoxidized groundnut oil, epoxidized linseed oil and epoxidized sunflower oil.

As hydroxy compounds to be reacted according to the invention with the monocarboxylic acids containing epoxide groups, or with esters thereof, there are suitable alcohols and phenols. Examples of suitable alcohols are: Mono-alcohols such as methanol, ethanol, propanol, n-butanol, n-hexanol, undecylic alcohol, lauryl alcohol, myristyl alcohol, palmityl alcohol, stearyl alcohol and cetyl alcohol; diols or polyols such as ethyleneglycol, diethyleneglycol, triethyleneglycol, propyleneglycol-1:2, propyleneglycol-1:3, butanediol-1:4, 2-methylpentanediol-2:4, pentanediol-1:5, hexanediol-1:6; bis-β-hydroxyethyl ether of bisphenol A [2:2′-bis(para-hydroxyphenyl)-propane] or of tetrachloro-bisphenol A.

As phenols there may be mentioned: Monophenols such as phenol, ortho-, meta- and para-cresol, 2:3-xylenol, 2:5-xylenol, 3:4-xylenol, guaiacol, α-naphthol, β-naphthol, ortho-, meta- and para-chlorophenol, dichlorophenol, para-tertiary butylphenol, para-octylphenol; diphenols and polyphenols such as hydroquinone or resorcinol; bis-[para-hydroxy - phenyl]-methane, bis-[para-hydroxyphenyl]-phenyl-methane, bis[para-hydroxyphenyl]-tolyl-methane, chlorinated phenols such as bis-[3 - chloro-4-hydroxyphenyl]-dimethyl-methane; condensation products of phenols (such as cresol or phenol) with formaldehyde (resoles and novolaks) and more especially bis[para-hydroyphenyl]-dimethylmethane.

The further reaction of the primarily formed aliphatic epoxymonocarboxylic acid etherified with alcohol or phenol, or the ester thereof, with the diamine or polyamine is advantageously performed at an elevated temperature ranging, for example, from 200° to 250° C., while distilling off the water and/or the esterifying alcohol eliminated in the course of the reaction.

As aliphatic polyamines containing at least two primary or secondary amino groups, to be used as starting material in the present process, there are suitable di-primary-secondary and di-secondary polyamines of the aliphatic series, for example: N-hydroxyalkylenepolyamines such, for example, as N-hydroxyethyl-ethylenediamine,
N-hydroxyethyl-pentamethylenediamine,
N-hydroxypropyl-tetra-methylenediamine,
N-hydroxyethyl-diethylenetriamine,
N:N-di-[hydroxyethyl]-diethylenetriamine,
N:N″-di-[hydroxyethyl]-diethylenetriamine,
N-hydroxypropyl-diethylenetriamine,
N:N-di-[hydroxypropyl]-diethylenetriamine,
N:N″-di-[hydroxypropyl]-diethylenetriamine,
N:N:N″-tri-[hydroxypropyl]-triethylenetetramine,
N-hydroxyethyl-propylene-diamine,
N-hydroxypropylenediamine,
N-hydroxypropyl-propylenediamine,
N-hydroxyethyl-dipropylenetriamine,
N:N-di-[hydroxyethyl]-dipropylenetriamine,
N:N:N′-tri-[hydroxyethyl]triethylenetetramine, and hexamethylenediamine;

also cyanoethylated primary polyamines, for example the reaction products from 1 to 2 molecular proportions of acrylonitrile with 1 molecular proportion of ethylenediamine, diethylenetriamine or triethylenetetramine. It is of special advantage to use diprimary alkylenepolyamines, for example ethylenediamine, diethylenetriamine, triethylenetetramine, tetraethylenepentamine, trimethylenediamine or hexamethylenediamine.

[para - hydroxyphenyl]tolylmethane, 4:4′ - dihydroxydiphenyl, bis-[parahydrophenyl]-sulfone and more especially from bis[parahydroxyphenyl]-dimethylmethane.

There may be mentioned above all the epoxy resins that are liquid at room temperature, which are derived from bis[parahydroxyphenyl]dimethylmethane (bisphenol A) and contain 3.8 to 5.8 epoxide equivalents per kg. Such epoxy resins correspond to the average formula

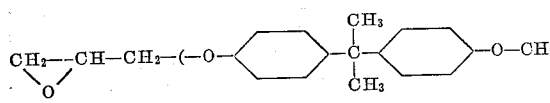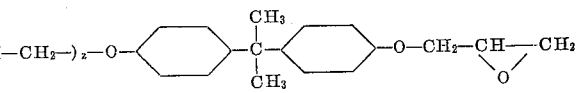

As mentioned above, the new polyamides containing amino groups are valuable curing agents for epoxy resins. Accordingly, the present invention includes also curable mixtures of epoxy compounds having an epoxide equivalence greater than 1 with amides containing amino groups as curing agents, which are obtained by reacting an aliphatic monocarboxylic acid containing at least one epoxide group and at least 12 carbon atoms, or an ester of such acid with a monohydric and/or polyhydric alcohol, in the first stage of the reaction with an alcohol and/or phenol, while splitting the epoxide group(s) of the monocarboxylic acid or of its ester, while etherifying the alcohol or phenol, and in the second stage of the reaction the resulting etherified product is reacted with an aliphatic diamine or polyamine containing at least two primary or secondary amino groups, accompanied by elimination of water or of alcohol.

As epoxy compounds having an epoxide equivalence greater than 1, to be used in the curable mixtures, there may be used, for example: Alicyclic polyepoxides such as vinylcyclohexene dioxide, limonene dioxide, dicyclopentadiene dioxide, ethyleneglycol-bis(3:4-epoxy-tetrahydrodicyclopentadien-8-yl)ether, (3:4-epoxy-tetrahydrodicyclopentadien-8-yl)glycidyl ether, butadiene diepoxide, epoxidized polybutadienes or copolymers of butadiene with ethylenically unsaturated compounds such as styrene or vinyl acetate; compounds containing two epoxy-cyclohexyl radicals, such as diethyleneglycol-bis(3:4-epoxycyclohexane carboxylate), bis-3:4[epoxy-cyclohexylmethyl]succinate, 3:4 - epoxy-6-methylcyclohexylmethyl)-3:4-epoxy-6-methylcyclohexane carboxylate and 3:4-epoxyhexahydrobenzal - 3:4 - epoxy - cyclohexane-1:1dimethanol.

Polyglycidyl esters, such as are obtained by reacting a dicarboxylic acid with epichlorohydrin or dichlorohydrin in the presence of an alkali; such polyesters may be derived from aliphatic dicarboxylic acids such as succinic acid or adipic acid, or more especially from aromatic dicarboxylic acids such as phthalic or terephthalic acid. There may be mentioned, for example, diglycidyl adipate and diglycidyl phthalate.

Basic polyepoxy compounds, such as are obtained by reacting primary or secondary aliphatic or aromatic diamines, such as aniline, toluidine, 4:4′-diaminodiphenylmethane, 4:4′ - di-(monomethylamino)-diphenylmethane or 4:4′-diaminodiphenylsulfone, with epichlorohydrin in the presence of an alkali.

Polyglycidyl ethers, such as are obtained by etherifying a dihydric or polyhydric alcohol or diphenol, or polyphenol respectively, with epichlorohydrin or dichlorohydrin in the presence of an alkali. These compounds may be derived from glycols such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol or glycerol, or more especially from diphenols, or polyphenols respectively, such as resorcinol, pyrocatechol, hydroquinone, 1:4 dihydroxynaphthalene, phenolformaldehyde condensation products of the resole or novolak type, bis - [para - hydroxyphenyl]methane, biswhere z is a small whole or fractional number from 0 to 2.

It is also possible to use mixtures of two or more of the monoepoxides and/or polyepoxides referred to above.

As is known, the methods conventionally used in the manufacture of polyepoxy compounds generally give rise to mixtures of compounds having different molecular weights, and these mixtures contain further a share of compounds whose terminal epoxide groups have been partially hydrolyzed. The epoxide equivalence of polyepoxy compounds need therefore not be a whole number, at least 2, but in each case it must be greater than 1.0.

The term "curing" as used in this context describes the conversion of the epoxy compound into an insoluble and infusible resin.

The curable mixtures of the invention may further contain suitable plasticisers such as dibutyl phthalate, dioctyl phthalate or tricresyl phosphate; inert diluents or so-called active diluents, more especially monoepoxides, for example butylglycide or cresylgylcide.

Furthermore, there may be added to the curable mixtures of the invention at any phase of the process before the curing operation other suitable additives, such as fillers, dyestuffs, pigments, flame-inhibiting substances, mould lubricants or the like. Suitable extenders are fillers are, for example, asphalt, bitumen, glass fibers, mica, quartz meal, cellulose, kaolin, ground dolomite, colloidal silica having a large specific surface (Aerosil) or metal powders, such as aluminum powder.

The curable mixtures of the invention are suitable for use—without or with fillers, if desired in the form of solutions or emulsions—as laminating resins, paints, lacquers, dipping resins, casting resins, moulding compositions, sealing compounds, putties, floor coverings, potting and insulating materials for the electrical industry, adhesives or the like, and also in the manufacture of such products.

Parts and percentages in the following examples are by weight, and the relationship between part by weight and part by volume is the same as that between the kilogram and the liter.

*Example 1*

243 parts of an epoxidized vegetable oil, containing 3.9 epoxide equivalents per kg. (marketed under the registered trademark "Estabex 2307") are reacted with 114 parts of bis[para-hydroxyphenyl]dimethylmethane (bisphenol A) for 1½ hours at 110–190° C. and then mixed with 146 parts of triethylenetetramine. The batch is then heated for 3 hours at 200 to 220° C. under an increasing water-jet vacuum, with glycerol distilling over.

Yield: 505 parts of a light-yellow polyamine-amide which is of pasty consistency at room temperature.

*Example 2*

The procedure is as described in Example 1, except that there are used 316 parts of an oleic acid epoxidized in the known manner with peracetic acid, containing 3.2 epoxide equivalents per kg., instead of 243 parts of "Estabex 2307," and only 73.7 instead of 114 parts of bis [para-hydroxyphenyl]dimethylmethane.

A highly viscous, dark-yellow polyamine-amide is obtained.

Example 3

1000 parts of soybean oil are epoxidized in the known manner by mixing it with 80 parts of formic acid of 98% strength, dropping in 600 parts of hydrogen peroxide of 35% strength while cooling, and allowing the batch to react for 48 hours at about 33° C. while stirring it vigorously. When the organic layer is isolated and washed with dilute sodium carbonate solution, an epoxidized soybean oil is obtained which contains 3.3 epoxide equivalents per kg.

254 parts of the epoxidized soybean oil prepared in this manner are reacted with 116.5 parts of monochlorphenol for 1½ hours at 98° C., to yield 370 parts of a light-yellow intermediate of medium viscosity; 100 parts of this product are mixed with 69.2 parts of triethylenetetramine and reacted for 4 hours at 195° C., whereupon within a further hour under a rising water-jet vacuum the volatile constituents or glycerol and excess triethylenetetramine are distilled off. Yield: 117 parts of a highly viscous, brownish polyamine-amide.

Example 4

The procedure is as described in Example 3, except that there are used 166 parts of tertiary butylphenol instead of 116.5 parts of monochlorophenol. Yield: 400 parts of a light-yellow intermediate of medium viscosity.

90 parts of the product thus obtained are reacted with 62 parts of triethylenetetramine as described in Example 3, to yield 105 parts of a highly-viscous, light-brown polyamine-amide.

Example 5

254 parts of the epoxidized soybean oil described in Example 3 are mixed with 254 parts of n-butanol, and 4.0 parts of boron trifluoride diethyl etherate (containing 48% of $BF_3$) are then added dropwise with vigorous stirring. The mixture heats up immediately and the temperature rises to 83° C. The excess of butanol that did not undergo etherification is distilled off under vacuum. Yield: 288 parts of a light-yellow intermediate of medium viscosity.

125 parts of the intermediate are mixed with 86.25 parts of triethylenetetramine and the batch is further processed as described in Example 3, to yield 146 parts of a yellowish polyamide of medium viscosity.

Example 6

The procedure is as described in Example 3, except that n-butanol is replaced by an equivalent quantity of allyl alcohol. After having distilled off the excess alcohol, there are obtained 282 parts of a reddish-yellow intermediate.

The intermediate is reacted with triethylenetetramine as described in Example 5, to yield 153 parts of a yellowish polyamine-amide of medium viscosity.

Example 7

Clear lacquers are prepared by mixing an epoxy resin which is liquid at room temperature (prepared by condensing 1 molecular proportion of bis[para-hydroxyphenyl] dimethylmethane with at least 2 molecular proportions of epichlorohydrin in the presence of aqueous sodium hydroxide solution), which contains 5.2 epoxide equivalents per kg. and has a viscosity of about 12,000 centipoises at 25° C. (Resin A), with the polyamine-amides manufactured as described in Examples 1 to 6 in the proportions shown in the following table. The clear lacquers are applied to glass plates and sheets of aluminum with a doctor roll. The lacquer films are then dried or cured respectively under the conditions shown in the table, and the times taken by them to become dust-dry are measured. In the case of the films cured on plates of glass the transparence and the hardness (measured with a pendulum hardness tester according to Persoz) are tested. In the case of the films cured on aluminum sheets the stretchability (Erichsen indentation test) is measured. The results are shown in the following table in which there are further shown the pot life values of the curable clear lacquers.

| Exper. No. | Polyamide as in Ex. No. | Amount in g. | Resin A in g. | Pot life of 20 g. of mixture, hrs./ 20° C. | Drying time curing conditions at about 65% relative humidity | Dust-dry after — hrs. |
|---|---|---|---|---|---|---|
| 1 | 1 | 50 | 50 | 6 | 120°, 1 hr | <1 |
| 2 | 2 | 50 | 50 | 16 | 18–20° | 16 |
| 3 | 2 | 50 | 50 | 16 | 120°, 1 hr | <1 |
| 4 | 3 | 50 | 50 | 8 | 160°, 1 hr | <1 |
| 5 | 3 | 50 | 50 | 8 | 18–22° | 2 |
| 6 | 3 | 50 | 100 | 8 | 18–22° | 3 |
| 7 | 4 | 50 | 50 | 9 | 160°, 1 hr | <1 |
| 8 | 4 | 50 | 50 | 9 | 18–22° | 6 |
| 9 | 5 | 50 | 50 | 9 | 160°, 1 hr | <1 |
| 10 | 5 | 50 | 50 | 9 | 18–22° | 11 |
| 11 | 6 | 50 | 50 | 8 | 160°, 1 hr | <1 |
| 12 | 6 | 50 | 50 | 8 | 18–22° | 14 |

| Exper. No. | Transparence of film on glass plate | | Pendulum hardness accdg. to Persoz in seconds, measured | | | Erichsen indentation value in mm. |
|---|---|---|---|---|---|---|
| | Before drying | After drying | Immed. after drying | After 2 days | After 10 days | |
| 1 | Clear | Clear | 322 | | | 6.8 |
| 2 | do | do | | 220 | 265 | 2.5 |
| 3 | do | do | 322 | | | 4.0 |
| 4 | Slightly turbid | do | 350 | | | 6.9 |
| 5 | do | do | | 156 | 206 | 6.2 |
| 6 | do | do | | 100 | 175 | 7.0 |
| 7 | do | do | 380 | | | 4.5 |
| 8 | do | do | | 166 | 225 | 6.5 |
| 9 | Clear | do | 340 | | | 7.8 |
| 10 | do | do | | 142 | 220 | 5.2 |
| 11 | Slightly turbid | do | 380 | | | 6.2 |
| 12 | do | do | | 182 | 235 | 2.5 |

Examples 8 to 18

The examples of lacquers Nos. 8 to 18 listed in the following table are comparative experiments and were prepared by mixing the epoxy resin liquid at room temperature (resin A) used in Example 7 with a calculated quantity of an amine curing agent as described below, the ratio being calculated to result in 1 amine-hydrogen equivalent per 1 epoxide equivalent.

The amine curing agents used were amides containing amino groups which were prepared by reacting the number of mols of hydroxycarboxylic acid shown in Column 2 with the number of mols of triethylenetetramine shown in Column 3. (Example 8 to 12.)

Additionally, there were used as further amine curing agents the reaction products (marketed under the registered trademarks "Versamid 115" and "Versamid 125") from dimerized, unsaturated vegetable fatty acids and aliphatic alkylenepolyamines (Examples 15 to 18).

The amine curing agent used in Examples 13 and 14 was the reaction product, prepared as described in Example 5, from epoxidized soybean oil and butanol followed by triethylenetetramine.

The lacquers were prepared by simply mixing together the amount of epoxy resin (resin A) shown in Column 7 with the amount of amine curing agent shown in Column 6, the mixture of resin and curing agent being brushed on glass plates or aluminum sheets with a doctor roll to produce films about $75\mu$ thick. The other data, such as viscosity etc., are shown in the headings and in the legend to the table.

| (1) | (2) | | | (3) | | (4) | (5) |
|---|---|---|---|---|---|---|---|
| | | | | Triethylene tetramine | | Reaction conditions | Viscosity of amine curing agent, cp./25° C. |
| Ex. No. | Hydroxycarboxylic acid—Name, formula | Mol | G. | Mol | G. | | |
| 8 | Lactic acid $CH_3-CH-COOH$ ; $OH$ | 1 | 90.0 | 1 | 146 | (a) | 1,920 |
| 9 | Tartaric acid $HOOC-CH-CH-COOH$ ; $OH$ $OH$ | 1 | 150.1 | 2 | 292 | (a) | 39,400 |
| 10 | Malic acid $HOOC-CH-CH_2-COOH$ ; $OH$ | 1 | 134.1 | 2 | 292 | (a) | 8,950 |
| 11 | Citric acid $HOOC-CH_2-C-CH_2-COOH$ ; $HOOC$ $OH$ | 1 | 210.1 | 2 | 292 | (a) | 626,000 |
| 12 | Salicylic acid (phenyl with -OH and -COOH) | 1 | 138.1 | 1 | 146 | (a) | 17,900 |
| 13 | Epoxidized soybean oil, reacted with n-butanol in presence of $BF_3$, as described in Example 5 | 1 | 212 | 1 | 146 | As in Ex. No. 5. | 20,000 |
| 14 | ____do____ | 1 | 212 | 1 | 146 | | 20,000 |
| 15 | "Versamid 115" | | | | | | 850,000 |
| 16 | ____do____ | | | | | | 850,000 |
| 17 | "Versamid 125" | | | | | | 76,200 |
| 18 | ____do____ | | | | | | 76,200 |

| (6) | (7) | (8) | (9) | | (10) |
|---|---|---|---|---|---|
| | | | Erichsen indentation value, in mm., on aluminium sheet—curing performed for 6 days at— | | Rating of film surface on glass plate (exudation after 24 hours) |
| Ex. No. / Amine curing agent, g. | Epoxy resin A, g. | Aspect of mixture (6)+(7) when brushed on glass plate | Room temp. | 120° C. | |
| 8 — 47.25 | 200 | Darkbrown, clear | 0.2 | 1.1 | 2 |
| 9 — 44.2 | 200 | ____do____ | 0.15 | 0.9 | 1 |
| 10 — 42.6 | 200 | ____do____ | 0.1 | 1.1 | 1 |
| 11 — 50.2 | 200 | ____do____ | 2.15 | 2.0 | 1 |
| 12 — 58.2 | 200 | Light-yellow, clear | 0.3 | 4.3 | 2–3 |
| 13 — 65 | 200 | ____do____ | 7.2 | 8.2 | 1 |
| 14 — 200 | 200 | ____do____ | 5.2 | 7.5 | 1 |
| 15 — 200 | 200 | Yellow turbid | 10 | 4.8 | 2 |
| 16 — 85.6 | 200 | ____do____ | 10 | 5.0 | 3 |
| 17 — 200 | 200 | ____do____ | 8.5 | 6.9 | 2 |
| 18 — 85.6 | 200 | ____do____ | 9.5 | 3.2 | 2 |

Reaction conditions: (a) Heated at 220° C. until 1 mol (2 mols resp.) of water has (have) passed over.
Legend—Exudation (10): Rating 1=no exudation; 2=medium exudation; 3=strong exudation.

What is claimed is:

1. An amino-amide, which is obtained by reacting an oxirane selected from the group consisting of aliphatic monocarboxylic acids having 1 to 2 oxirane groups and 12 to 18 carbon atoms, and esters of aliphatic monocarboxylic acids having 1 to 2 oxirane group and 12 to 18 carbon atoms, with a saturated aliphatic alcohol having 1 to 3 hydroxyl groups and 1 to 6 carbon atoms, in the first stage with a hydroxy compound selected from the group consisting of saturated aliphatic alcohols and phenols having at most two hydroxyl groups the carbon chain of which may be interrupted by oxygen atoms, in which first reaction stage and the hydroxy compound is etherfied, and by heating the resulting etherified product in the second stage with a saturated aliphatic diprimary polyamine, in which second reaction stage the group selected from the class consisting of carboxyl group and carboxylic acid ester group is converted into a carboxylic acid amide group with elimination of a compound selected from the group consisting of water and aliphatic saturated alcohol having 1 to 3 hydroxyl groups and 1 to 6 carbon atoms.

2. An amino-amide, which is obtained by reacting an epoxidized unsaturated fatty acid having 12 to 18 carbon atoms in the first reaction stage with a hydroxy compound selected from the group consisting of saturated aliphatic alcohols and phenols having at most two hydroxyl groups the carbon chain of which may be interrupted by oxygen atoms in which first reaction stage the oxirane group of the epoxidized fatty acid are split and the hydroxy compound is etherified, and by heating the resulting etherified product in a second stage with a diprimary polyalkylene polyamine, in which second reaction stage the carboxyl group of said fatty acid is converted into a carboxylic acid amide group with elimination of water.

3. An amino-amide, which is obtained by reacting an epoxidized unsaturated fatty acid having 12 to 18 carbon atoms in the first reaction stage with a lower aliphatic alcohol having 1 to 4 carbon atoms in which first reaction stage the oxirane group of the epoxidized unsaturated fatty acid are split and the alcohol is etherified, and by heating the resulting etherified product in the second stage with a diprimary polyalkylene polyamine, in which second reaction stage the carboxyl group of said fatty acid is converted into a carboxylic acid amide group with elimination of water.

4. An amino-amide, which is obtained by reacting an epoxidized unsaturated fatty acid having 12 to 18 carbon atoms in the first reaction stage with bis(p-hydroxyphenyl)dimethylmethane, in which first reaction stage the oxirane group of the epoxidized fatty acid are split and the diphenol is etherified, and by heating the resulting etherified product in the second stage with a diprimary polyalkylene polyamine, in which second reaction stage the carboxyl group of said fatty acid is converted into a carboxylic acid amide group with elimination of water.

5. An amino-amide, which is obtained by reacting an epoxidized unsaturated vegetable oil in the first reaction stage with a hydroxy compound selected from the group consisting of saturated aliphatic alcohols and phenols having at most two hydroxyl groups the carbon chain of which may be interrupted by oxygen atoms, in which first reaction stage the oxirane group of the epoxidized unsaturated vegtable oil are split and the hydroxy compound is etherified, and by heating the resulting etherified product in the second stage with a diprimary polyalkylene polyamine, in which second reaction stage the carboxylic acid ester groups of said vegetable oil are converted into carboxylic acid amide groups with elimination of glycerol.

6. An amino-amide, which is obtained by reacting an epoxidized unsaturated vegetable oil in the first reaction stage with a lower aliphatic alcohol having 1 to 4 carbon atoms, in which first reaction stage the oxirane group of the epoxidized unsaturated vegetable oil are split and the alcohol is etherified, and by heating the resulting etherified product in the second stage with a diprimary polyalkylene polyamine, in which second reaction stage the carboxylic acid ester groups of said vegetable oil are converted into carboxylic acid amide groups with elimination of glycerol.

7. An amino-amide, which is obtained by reacting an epoxidized unsaturated vegetable oil in the first reaction stage with bis(p - hydroxyphenyl)dimethylmethane in which first reaction stage the oxirane group of the epoxidized unsaturated vegetable oil are split and the diphenol is etherified, and by heating the resulting etherified product in the second stage with a diprimary polyalkylene polyamine, in which second reaction stage the carboxylic acid ester groups of said vegetable oil are converted into carboxylic acid amide groups with elimination of glycerol.

References Cited

UNITED STATES PATENTS

| 3,008,909 | 11/1961 | Ernst | 260—18 |
| 3,042,692 | 7/1962 | Findley | 260—404.5 |
| 3,065,247 | 11/1962 | De Groote et al. | 260—404.5 |
| 3,085,075 | 4/1963 | Lockshin | 260—18 |

NICHOLAS S. RIZZO, *Primary Examiner.*

ROBERT V. HINES, ANTON H. SUTTO,
*Assistant Examiners.*